United States Patent
Hirai

(10) Patent No.: US 7,320,128 B2
(45) Date of Patent: Jan. 15, 2008

(54) METHOD OF INSTALLING SOFTWARE, AND STORAGE MEDIUM

(75) Inventor: Nobuyuki Hirai, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 715 days.

(21) Appl. No.: 10/763,221

(22) Filed: Jan. 26, 2004

(65) Prior Publication Data

US 2004/0154015 A1 Aug. 5, 2004

(30) Foreign Application Priority Data

Jan. 31, 2003 (JP) ............................. 2003-024195

(51) Int. Cl.
*G06F 9/445* (2006.01)
*G06F 9/44* (2006.01)

(52) U.S. Cl. ...................... 717/174; 717/175; 717/176; 717/177; 717/178; 717/162

(58) Field of Classification Search ........ 717/174–178, 717/162
See application file for complete search history.

(56) References Cited

U.S. PATENT DOCUMENTS

| | | | | |
|---|---|---|---|---|
| 5,481,714 A | * | 1/1996 | Pipkin et al. ................ | 717/175 |
| 5,548,745 A | | 8/1996 | Egan et al. .................. | 395/500 |
| 5,666,501 A | * | 9/1997 | Jones et al. .................. | 717/177 |
| 5,794,052 A | * | 8/1998 | Harding ...................... | 717/178 |
| 5,909,581 A | * | 6/1999 | Park ............................ | 717/170 |
| 6,006,035 A | * | 12/1999 | Nabahi ........................ | 717/175 |
| 6,066,182 A | * | 5/2000 | Wilde et al. ................. | 717/175 |
| 6,308,288 B1 | * | 10/2001 | Chang et al. ................ | 717/124 |
| 6,446,260 B1 | * | 9/2002 | Wilde et al. ................. | 717/173 |
| 6,591,418 B2 | * | 7/2003 | Bryan et al. ................. | 717/177 |
| 6,684,397 B1 | * | 1/2004 | Byer et al. ................... | 717/174 |
| 2002/0092013 A1 | | 7/2002 | Delo ........................... | 717/174 |

FOREIGN PATENT DOCUMENTS

JP 2001-177672 6/2001

OTHER PUBLICATIONS

Green, Robin "What You Installed Is What You See: Help Navigation in Modular Software Products", 2000, IEEE, p. 521-533.*

* cited by examiner

*Primary Examiner*—Wei Zhen
*Assistant Examiner*—Qamrun Nahar
(74) *Attorney, Agent, or Firm*—Fitzpatrick, Cella, Harper & Scinto.

(57) ABSTRACT

It aims to provide a software installing method which can automatically perform appropriate link setup even when second software is installed after first software was installed, and a storage medium which stores the installed software. To do so, there are provided a first installation step of installing the first software, a second installation step of installing the second software, a first link setup step of performing link setup of the second software already installed, when the installation of the first software in the first installation step ends, and a second link setup step of performing link setup of the second software installed in the second installation step, when the installation of the second software ends.

8 Claims, 5 Drawing Sheets

METHOD OF INSTALLING SOFTWARE, AND STORAGE MEDIUM

BACKGROUND OF THE INVENTION

1. Field of the Invention

The present invention relates to a method of installing mutually associated softwares, and a storage medium for storing the installed softwares.

2. Related Background Art

Conventionally, a system which operates according to a first software and one or more second softwares operable while linking to the first software is known. More specifically, a system as disclosed in Japanese Patent Application Laid-Open No. 2001-177672 in which an image scanned by a first software through a scanner driver is given to a registered (linked) second software such as an OCR (optical character recognition) application or the like is known.

In such a system, when installation of the first software ends, link setup is automatically performed only to the second software which has already been installed.

However, conventionally, when the second software is installed after the first software was installed, there is an inconvenience that the link setup is not automatically performed to the first software. For this reason, a user is obliged to manually perform the link setup to the first software, whereby there is a problem that the user has to perform a complicated and difficult operation.

SUMMARY OF THE INVENTION

An object of the present invention is to provide a software installing method which can automatically perform appropriate link setup even when a second software is installed after a first software was installed, and a storage medium which stores the installed software.

Other object and features of the present invention will be apparent from the following description in conjunction with the accompanying drawings.

DETAILED DESCRIPTION OF THE PREFERRED EMBODIMENT

Figure 1:
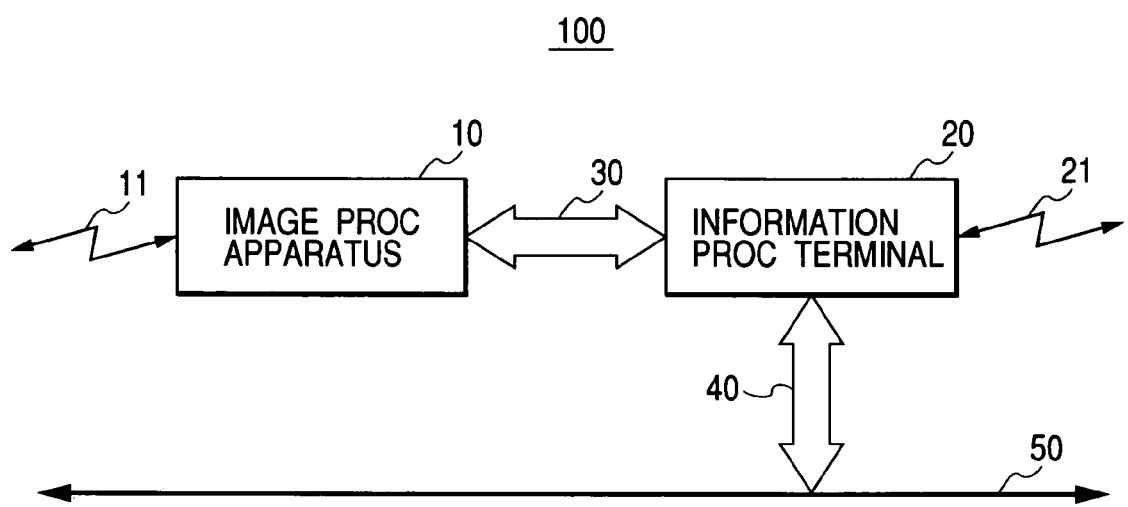
FIG. 1 is a block diagram showing the basic structure of an image processing system 100 according to the embodiment of the present invention.

FIG. 1 is a block diagram showing the basic structure of an image processing system 100 according to the embodiment of the present invention.

The image processing system 100 mainly consists of an image processing apparatus 10 and an information processing terminal 20. Here, it should be noted that the image processing apparatus 10 has various functions such as a printer function, a scanner function, a facsimile function, a copying function, a memory card function and the like, and the image processing apparatus 10 and the information processing terminal 20 mutually transmit/receive various control instructions and data through an external I/F (interface) 30. Incidentally, because the above various control instructions and the data are transmitted and received in a known method, detailed explanations of these operations are omitted.

The information processing terminal 20 is connected to a network 50 through a network I/F 40. Incidentally, not-shown another information processing terminal may be connected to the network 50 through a network I/F. Moreover, the image processing apparatus 10 and the information processing terminal 20 may transmit/receive various data, image information and the like to/from another communication apparatus respectively through communication lines 11 and 21.

Figure 2:
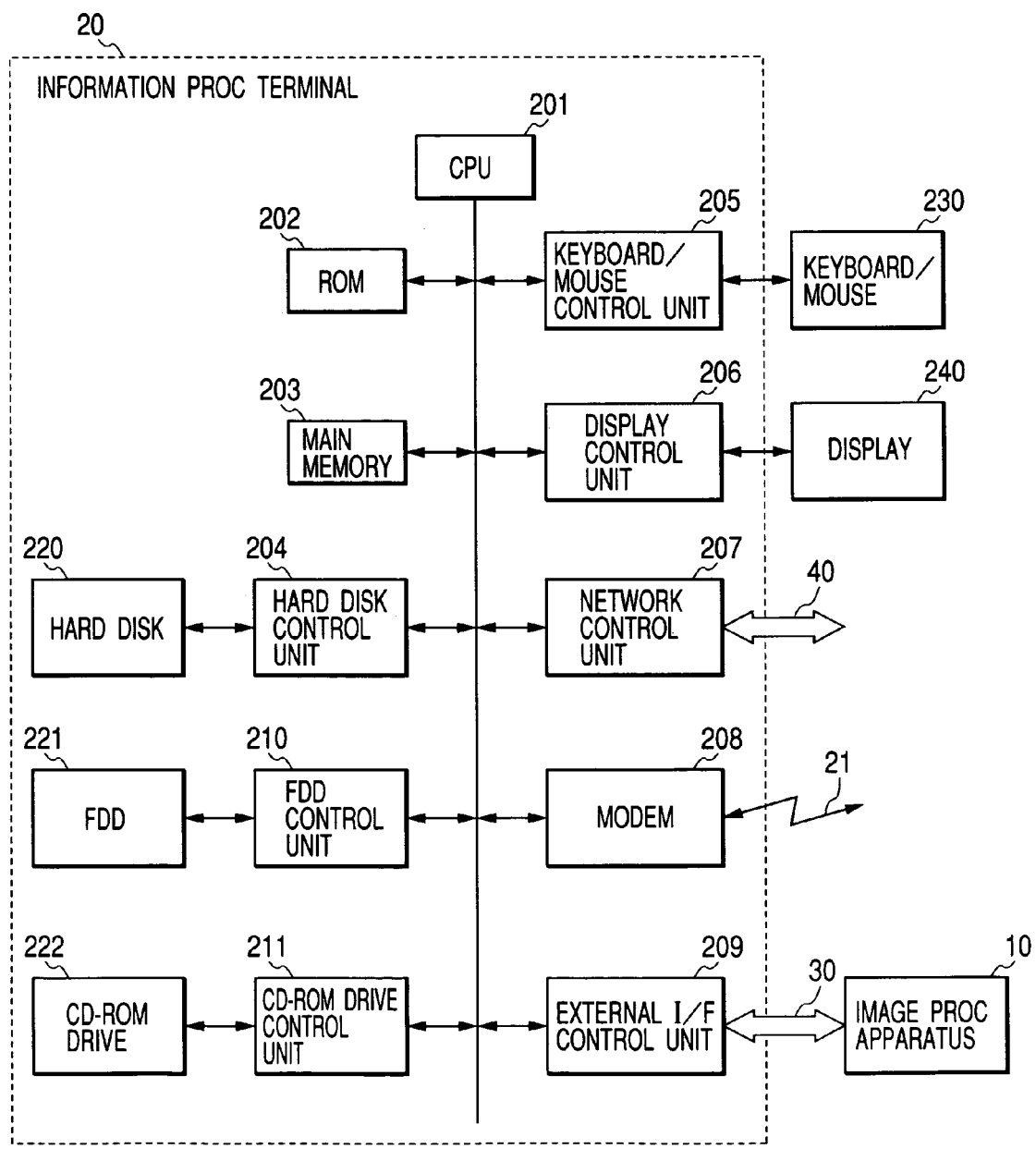
FIG. 2 is a block diagram showing the basic structure of an information processing terminal 20.

FIG. 2 is a block diagram showing the basic structure of the information processing terminal 20.

In FIG. 2, a CPU 201 controls entire operations of the information processing terminal 20 through system buses in accordance with programs stored in a ROM 202, a main memory 203 or a hard disk 220, or programs read from an FDD (flexible disk drive) 221 or a CD-ROM drive 222.

More specifically, the ROM 202 stores control programs to be used for the CPU 201, and the main memory 203 temporarily stores the programs and the image data so that the processes of the information processing terminal 20 can be performed at high speed.

A hard disk control unit 204 controls the hard disk 220 in which an operating system, various application programs, image data and the like are stored. Moreover, various application softwares and driver softwares according to the embodiment are installed in the hard disk 220. Ordinarily, these application softwares and these driver softwares are supplied from another computer-readable memory medium and then installed in the hard disk 220 through the FDD 221, the CD-ROM drive 222 and the like. Besides, the application software and the driver software can also be downloaded through a network control unit 207 and a modem 208 and then installed in the hard disk 220.

A keyboard/mouse control unit 205 controls a keyboard/mouse 230 which acts as an input means for inputting an instruction from an operator (or a user), and a display control unit 206 controls a display 240 which performs various displays to the operator.

A network control unit 207 performs control to connect the information processing terminal 20 to a not-shown network through the network I/F 40. Here, because a known method is adopted to connect the information processing terminal 20 to the network, a detailed explanation of such connection is omitted.

The modem 208 performs connection to a provider, and also performs communication of data, image information and the like to a communication partner's apparatus.

An external I/F control unit 209 consists of a serial I/O (input/output) I/F LSI, a parallel I/O I/F LSI and the like, and transmits/receives various control instructions and data to/from the image processing apparatus 10 through the external I/F 30.

An FDD control unit 210 controls the FDD 221, and a CD-ROM drive control unit 211 controls the CD-ROM drive 222.

Figure 3:
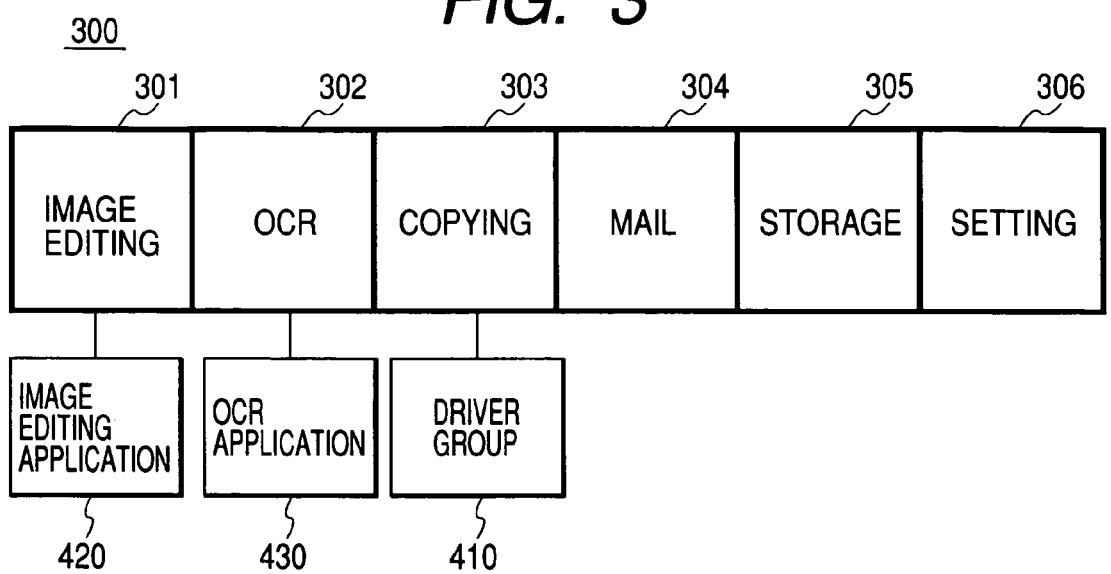
FIG. 3 is a diagram for explaining a toolbox 300 which is one example of a first software installed in the information processing terminal 20.

FIG. 3 is a diagram for explaining a toolbox 300 which is one example of a first software installed in the information processing terminal 20.

The toolbox 300 which consists of scan start buttons 301 to 305 and a setup button 306 is an application software which is activated by an operator's handling. Besides, the toolbox 300 may be automatically activated when the information processing terminal 20 is activated.

On the toolbox 300, when each scan start button is clicked, a scan operation is performed in a reading mode (concerning color, gray scale, binary, resolution, size, or the like) set in regard to each button. After the scan operation was performed, setup is performed for each button, and the process starts.

Incidentally, on condition that second softwares such as a later-described image editing application 420 and a later-described OCR application 430 are set respectively to the image editing button 301 and the OCR button 302, when each button is clicked, an original is read in the reading mode corresponding to the clicked button, the read data is given to the set second software, and the second software is then activated.

When the copying button 303 is clicked, the original is read in the set reading mode, and the read data is then given to the set printer driver, whereby the print image is obtained based on the read original. In this case, the printer driver may display a setup dialog box by which the detailed setup is performed for the printing. Besides, a printer driver included in a later-described driver group 410 may be automatically set as the printer driver.

When the mail button 304 is clicked, the original is read in the set reading mode, and the read image is then given to a set electronic mail application in a set file format, whereby the electronic mail application is activated to form an attached file.

When the storage button 305 is clicked, the original is read in the set reading mode, and the read data is then stored in a hard disk or the like in the information processing terminal 20, as a file name set in the set file format.

When the setup button 306 is clicked, a setup dialog box for setting the reading modes corresponding to the respective buttons, the target applications and the target drivers is displayed, whereby the operator can confirm, change and save (store) the various settings.

Figure 4:
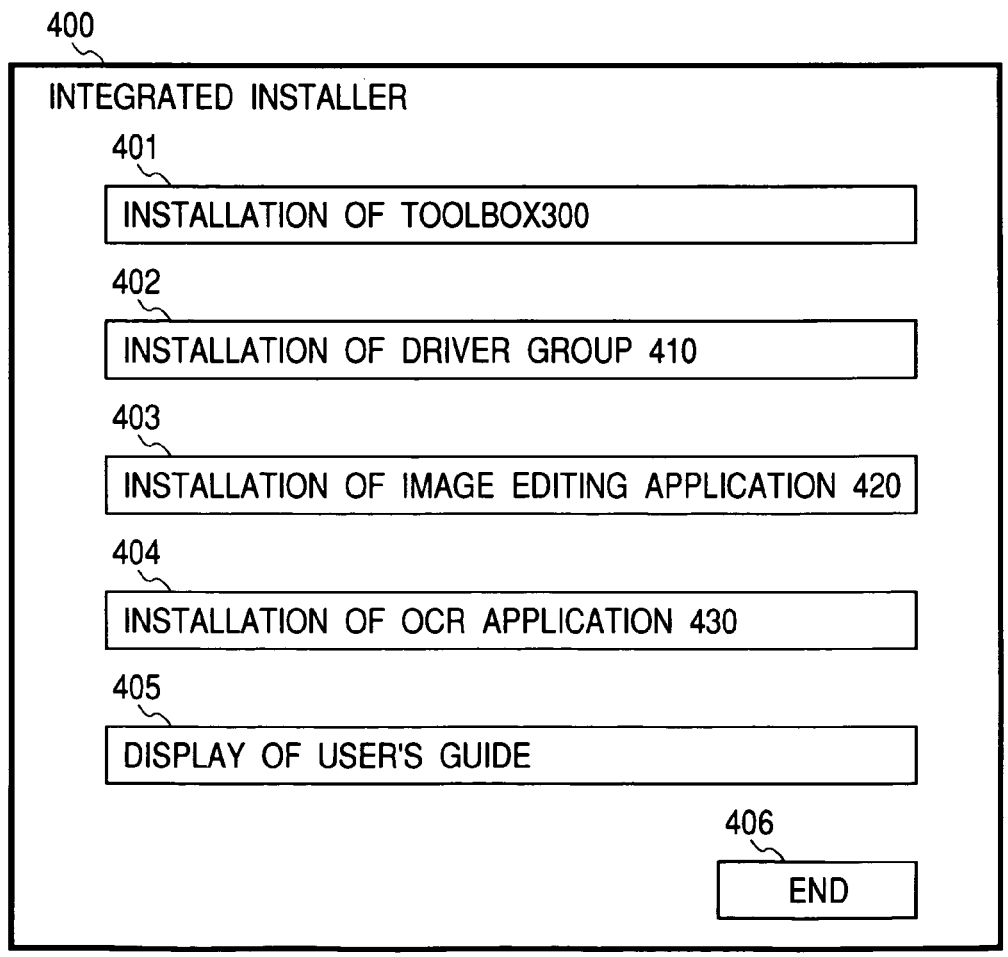
FIG. 4 is a diagram for explaining an integrated installer 400 which installs drivers and applications in the information processing terminal 20.

FIG. 4 is a diagram for explaining an integrated installer 400 which installs the drivers and the applications in the information processing terminal 20.

Here, it should be noted that the integrated installer 400 is a program which is supplied from a medium such as a CD-ROM or the like and activated by an operator's handling. For example, it is desirable to cause the information processing terminal 20 to automatically activate the integrated installer 400 when the CD-ROM is loaded in the CD-ROM drive 222.

Incidentally, six buttons 401 to 406 are provided on the integrated installer 400. Thus, when the respective buttons are clicked, the following operations are performed.

When the toolbox installation button 401 is clicked, a toolbox 300 being the first software is installed. Besides, when the driver installation button 402 is clicked, the driver group 410 including the printer driver, the scanner driver and the like necessary to perform the printing, the scanning and the like in the image processing apparatus 10 is installed from the information processing terminal 20.

Moreover, when the image editing application installation button 403 is clicked, the image editing application 420 being the second software is installed. Besides, when the OCR application installation button 404 is clicked, the OCR application 430 being the second software is installed.

Furthermore, when the user's guide button 405 is clicked, a dialog box for selecting which user's guide should be displayed for the drivers and the applications, whereby the operator can access the desired user's guide. Besides, when the end button 406 is clicked, the integrated installer 400 ends.

Figure 5:
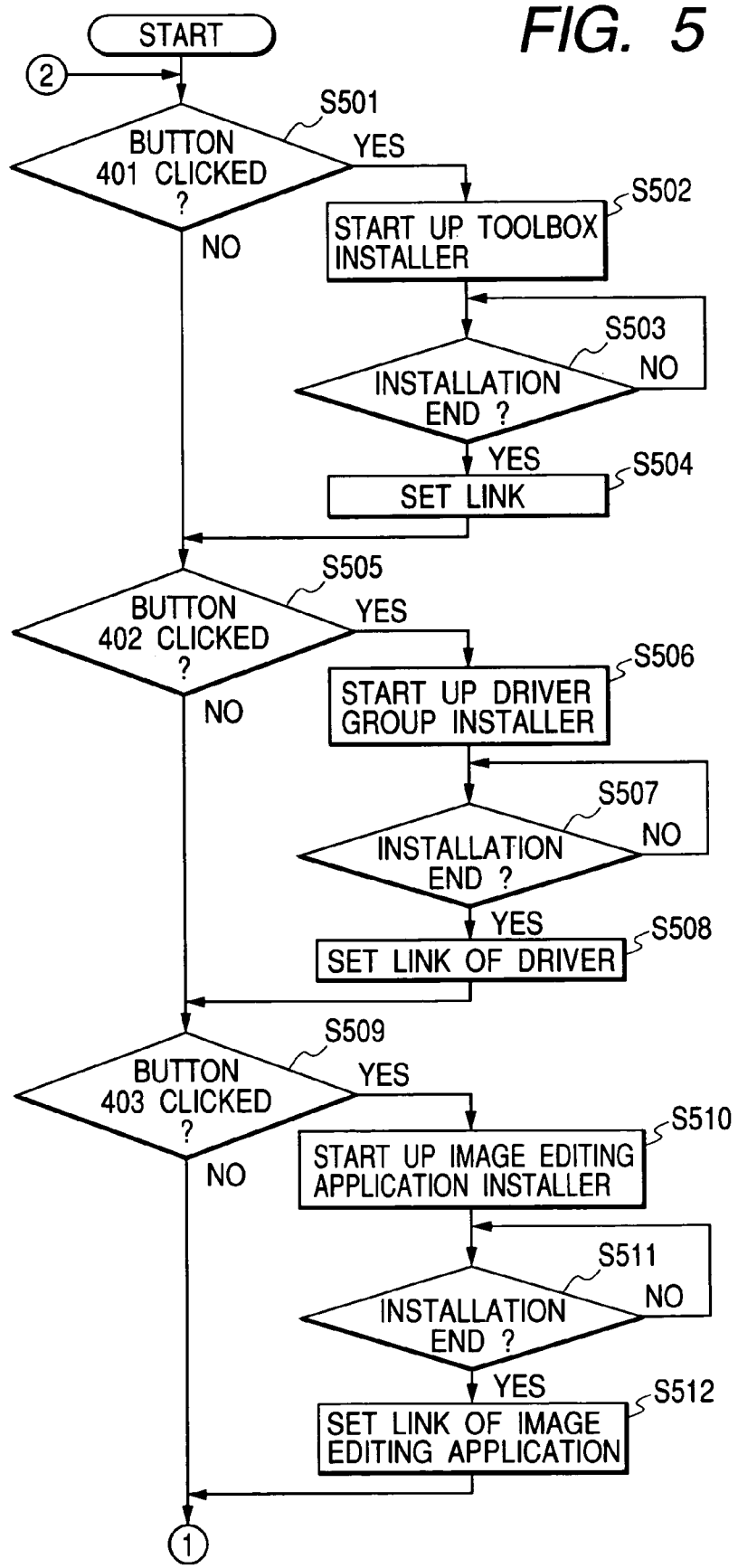
FIG. 5 is a flow chart showing the process of the integrated installer 400 in the information processing terminal 20.

FIG. 5 is a flow chart showing the process of the integrated installer 400 in the information processing terminal 20.

When the integrated installer 400 is activated, it is first judged whether or not the toolbox installation button 401 is clicked (step S501). When it is judged that the toolbox installation button 401 is clicked, the installer for installing the toolbox 300 is activated (step S502). Then, the operation is monitored until the installation ends (step S503). When the end of the installation is monitored, it may be monitored whether or not a window having a designated caption name is present. Also, it may be monitored whether or not a process handle of the activated installer is present.

When it is monitored and judged in the step S503 that the installation ends, the flow advances to a step S504 to perform link setup. In the step S504, from among the image editing application 420 linked to the image editing button 301, the OCR application 430 linked to the OCR button 302, and the printer driver included in the driver group 410 linked to the copying button 303, the link setup is performed only to the application and the print driver already installed into the information processing terminal 20.

After the link setup ended in the step S504, or when it is judged in the step S501 that the toolbox installation button 401 is not clicked, the flow advances to a step S505.

In the step S505, it is judged whether or not the driver installation button 402 is clicked. When it is judged that the driver installation button 402 is clicked, the installer for installing the driver group 410 is activated (step S506), and the operation is monitored until the installation ends (step S507). When the end of the installation is monitored, it may be monitored whether or not a window having a designated caption name is present. Also, it may be monitored whether or not a process handle of the activated installer is present.

When it is monitored and judged in the step S507 that the installation ends, the flow advances to a step S508 to perform link setup. In the step S508, only when the toolbox 300 has been installed, it is set to link the printer driver in the driver group 410 to the copying button 303 on the toolbox 300.

After the link setup ended in the step S508, or when it is judged in the step S505 that the driver installation button 402 is not clicked, the flow advances to a step S509.

In the step S509, it is judged whether or not the image editing application installation button 403 is clicked. When it is judged that the image editing application installation button 403 is clicked, the installer for installing the image editing application 420 is activated (step S510), and the operation is monitored until the installation ends (step S511). When the end of the installation is monitored, it may be monitored whether or not a window having a designated caption name is present. Also, it may be monitored whether or not a process handle of the activated installer is present.

When it is monitored and judged in the step S511 that the installation ends, the flow advances to a step S512 to perform link setup. In the step S512, only when the toolbox 300 has been installed, it is set to link the image editing application 420 to the image editing button 301 on the toolbox 300.

Figure 6:
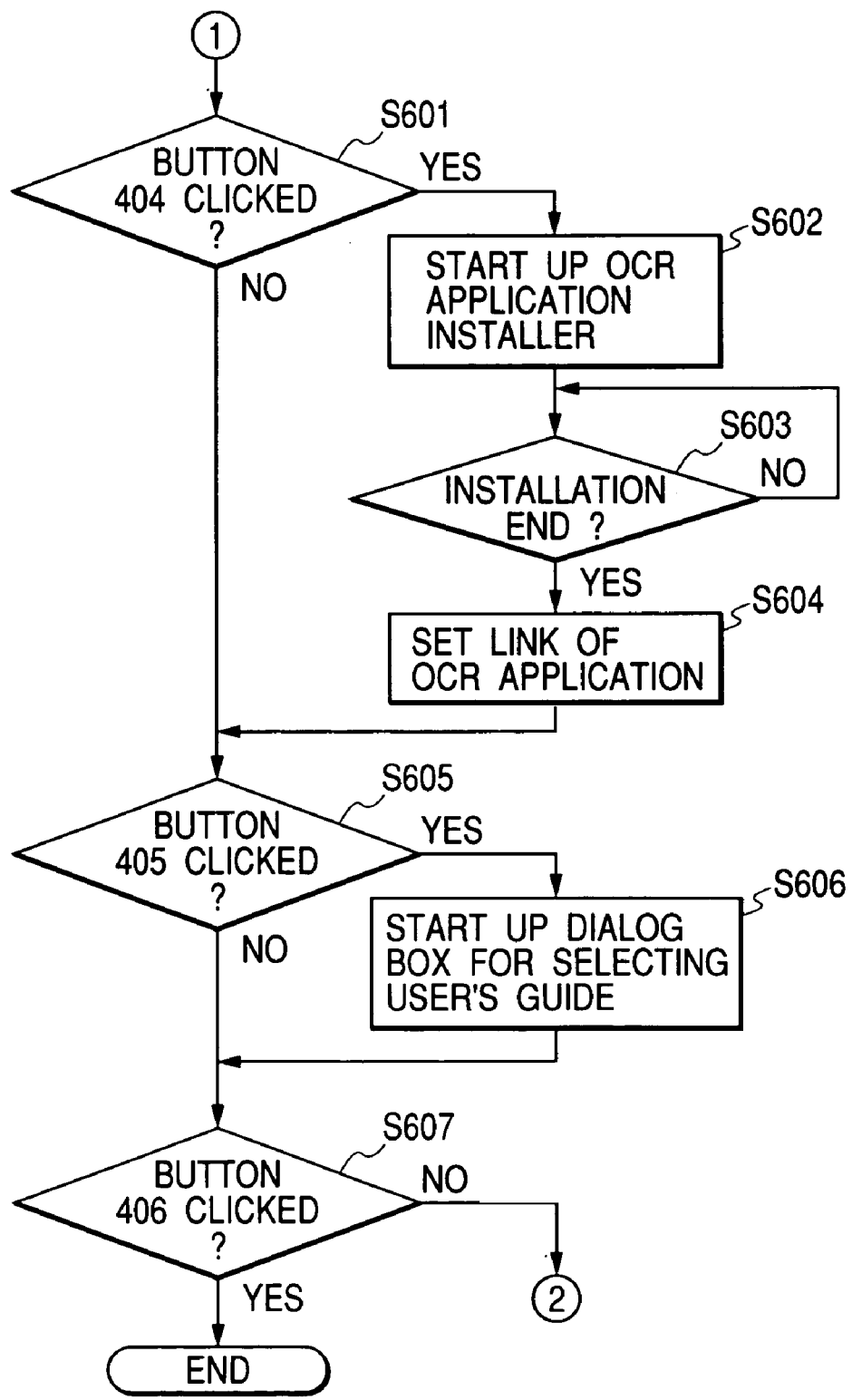
FIG. 6 is a flow chart showing the successive process of the integrated installer 400 in the information processing terminal 20.

After the link setup ended in the step S512, or when it is judged in the step S509 that the image editing application installation button 403 is not clicked, the flow advances to a step S601 shown in FIG. 6.

FIG. 6 is the flow chart showing the successive process of the integrated installer 400 in the information processing terminal 20.

In the step S601, it is judged whether or not the OCR application installation button 404 is clicked. When it is judged that the OCR application installation button 404 is clicked, the installer for installing the OCR application 430 is activated (step S602), and the operation is monitored until the installation ends (step S603). When the end of the installation is monitored, it may be monitored whether or not a window having a designated caption name is present. Also, it may be monitored whether or not a process handle of the activated installer is present.

When it is monitored and judged in the step S603 that the installation ends, the flow advances to a step S604 to perform link setup. In the step S604, only when the toolbox 300 has been installed, it is set to link the OCR application 430 to the OCR button 302 on the toolbox 300.

After the link setup ended in the step S604, or when it is judged in the step S601 that the OCR application installation button 404 is not clicked, the flow advances to a step S605.

In the step S605, it is judged whether or not the user's guide button 405 is clicked. When it is judged that the user's guide button 405 is clicked, the dialog box for selecting which user's guide should be displayed for the drivers and the applications is activated (step S606), and the flow advances to a step S607. In addition, when it is judged in the step S605 that the user's guide button 405 is not clicked, the flow advances to the step S607.

In the step S607, it is judged whether or not the end button 406 is clicked. When it is judged that the end button 406 is not clicked, the flow returns to the step S501 shown in FIG. 5. On the contrary, when it is judged that the end button 406 is clicked, the dialog box of the integrated installer 400 is closed, and the process ends.

In the present embodiment, the button for installing the driver group 410, the button for installing the image editing application 420 and the button for installing the OCR application 430 are independently provided, and the installation and the link setup for each of the driver and the applications are performed when the corresponding button is clicked. Instead, it is possible to previously select which of the driver group 410, the image editing application 420 and the OCR application 430, and then click a batch installation button.

In this case, it is possible to select the plural items (i.e., driver/applications) from among the driver group 410, the image editing application 420 and the OCR application 430. Thus, when the batch installation button is clicked, the selected items are sequentially installed, and then the link setup is automatically performed for all the installed items.

Moreover, the object of the present invention can be achieved in a case where a storage medium storing program codes of software to realize the functions of the above embodiment is supplied to a system or an apparatus and then a computer (or CPU or MPU) in the system or the apparatus reads and executes the program codes stored in the storage medium.

In this case, the program codes themselves read from the storage medium realize the functions of the present invention, whereby the storage medium storing these program codes constitutes the present invention. As the storage medium for supplying the program codes, for example, a Floppy Disk™, an optical disk, a magnetooptical disk, a CD-ROM, a CD-R, a magnetic tape, a nonvolatile memory card, a ROM or the like can be used.

Moreover, the present invention includes not only a case where the functions of the above embodiment are realized by executing the program codes read by the computer, but also a case where an OS (operating system) or the like functioning on the computer executes a part or all of the actual process according to instructions of the program codes, whereby the functions of the above embodiment are achieved by that process.

According to the present invention, the link setup for the second software is automatically performed when the installation of the second software ends, whereby it is possible not to urge the operator to manually perform the link setup which is generally difficult for the operator, and it is also possible to provide the software installation method which is highly convenient for the operator.

As many apparently widely different embodiments of the present invention can be made without departing from the spirit and scope thereof, it is to be understood that the present invention is not limited to the specific embodiment thereof expect as defined in the appended claims.

What is claimed is:

1. A software installation method which installs first software and second software capable of operating while linking to said first software, comprising:
    a first installation step of installing said first software;
    a second installation step of installing said second software;
    a first link setup step of performing link setup of said second software already installed, when the installation of said first software in said first installation step ends; and
    a second link setup step of performing link setup of said second software installed in said second installation step, when the installation of said second software ends,
    wherein said first link setup step performs the link setup of said second software already installed in association with a button of said first software,
    and wherein said second link setup step performs the link setup of said second software installed in said second installation step, in association with the button of said first software already installed.

2. A software installation method according to claim 1, wherein said second link setup step operates only when said first software has already been installed.

3. A software installation method which installs first software and second software capable of operating while linking to said first software, comprising:
    a first installation step of installing said first software;
    a first monitoring step of monitoring that the installation of said first software in said first installation step ended;
    a second installation step of installing said second software;
    a second monitoring step of monitoring that the installation of said second software in said second installation step ended;
    a first link setup step of performing link setup of said second software already installed, when it is judged in said first monitoring step that the installation of said first software ended; and a second link setup step of performing link setup of said second software installed in said second installation step, when it is judged in said second monitoring step that the installation of said second software ended, wherein said first link setup step performs the link setup of said second software already installed in association with a button of said first software, and wherein said second link setup step performs the link setup of said second software installed in said second installation step, in association with the button of said first software already installed.

4. A software installation method according to claim 3, wherein said second link setup step operates only when said first software has already been installed.

5. A storage medium which computer-readably stores a program for installing first software and second software capable of operating while linking to said first software, said program executing:

a first installation step of installing said first software;

a second installation step of installing said second software;

a first link setup step of performing link setup of said second software already installed, when the installation of said first software in said first installation step ends; and a second link setup step of performing link setup of said second software installed in said second installation step, when the installation of said second software ends, wherein said first link setup step performs the link setup of said second software already installed in association with a button of said first software, and wherein said second link setup step performs the link setup of said second software installed in said second installation step, in association with the button of said first software already installed.

6. A storage medium according to claim 5, wherein said second link setup step operates only when said first software has already been installed.

7. A storage medium which computer-readably stores a program for installing first software and second software capable of operating while linking to said first software, said program executing:

a first installation step of installing said first software;

a first monitoring step of monitoring that the installation of said first software in said first installation step ended;

a second installation step of installing said second software;

a second monitoring step of monitoring that the installation of said second software in said second installation step ended;

a first link setup step of performing link setup of said second software already installed, when it is judged in said first monitoring step that the installation of said first software ended; and a second link setup step of performing link setup of said second software installed in said second installation step, when it is judged in said second monitoring step that the installation of said second software ended, wherein said first link setup step performs the link setup of said second software already installed in association with a button of said first software, and wherein said second link setup step performs the link setup of said second software installed in said second installation step, in association with the button of said first software already installed.

8. A storage medium according to claim 7, wherein said second link setup step operates only when said first software has already been installed.

* * * * *